May 20, 1969  J. LA RAUS  3,445,001

WATER PURIFIER

Filed June 2, 1967

INVENTOR.
JULIUS LA RAUS
BY
Attorney

United States Patent Office 3,445,001
Patented May 20, 1969

3,445,001
WATER PURIFIER
Julius La Raus, Brighton, N.Y., assignor to Ozonator Corporation, Batavia, N.Y., a corporation of New York
Filed June 2, 1967, Ser. No. 643,095
Int. Cl. C02b 1/38
U.S. Cl. 210—98                                     8 Claims

ABSTRACT OF THE DISCLOSURE

Water and ozone are supplied to a tank adapted to be connected to a domestic or household water system. A compressor supplies air to an ozone generator, the output of which is controlled by a normally-closed valve, which is disposed between the generator and tank. Whenever a faucet in the associated household system is opened, a switch is closed to open the valve electrically to admit ozone to the tank. An electrical timer in the system periodically closes a second normally-open switch, which is in parallel with the first switch, to feed ozone from the generator to the tank periodically, and independently of the faucets.

---

This invention relates to a water purification system, and more particularly to a system for purifying well water for household use.

In many localities, particularly on farms where drinking water is drawn from wells, ground water and septic tank seepage into the wells may severely contaminate the water. Purification of the water on farms or where wells are used as a water source is, therefore, essential. Disease may, of course, be avoided by adequately chlorinating the drinking water before using it, but if the chlorination is too heavy the water is not potable.

Another difficulty with drinking water is the high sulphur content, which causes the water to have an unpleasant taste and odor. Sulphur may be eliminated from drinking water by also using heavy applications of chlorine, or special tanks of activated charcoal, but these remedies are rather expensive.

It has been known for many years that ozone has properties that are particularly valuable for purifying water. It is perhaps the most active purifier known to man. It is more potent than iodine, chlorine, alcohol, or potassium permanganate. Moreover, when ozone comes in contact with unpalatable water, it instantaneously improves the taste by removing all obnoxious odors and tastes, such as those produced by sulphur. Yet ozone will not in the least harm the good tastes in water. In the purification of water, ozone is a most potent germicide. All pathogenic and saprophytic microbs are destroyed by ozone. It kills bacteria; it combines with sulphur to make water soluble sulphite; and it will cause iron to precipitate to ferric hydroxide, which settles to the bottom of a water tank or the like, where it can be drawn off. After ozone has done its job in conditioning and purifying water, it reverts to its normal oxygen form ($O_2$), which is in the air we breathe, and leaves a pure, clean water, delicious to the taste.

Ozone water purification systems have been used for large scale work but have not proved satisfactory for small installations such as household use.

It is an object of this invention to provide an ozone water purification system, particularly adapted for use in conjunction with the water supply for an individual farm or home.

Another object of this invention is to provide for homeowners a domestic ozone water purification system, which is relatively inexpensive and maintenance free.

A further object of this invention is to provide a domestic ozone water purification system, which automatically operates to maintain a purified water supply.

A more specific object of this invention is to provide an improved ozone water purification system, which can be adjusted to maintain desired purification in the system despite changes in the overall water level in the system.

Other objects of the invention will be apparent hereinafter from the specification and from the recital of the appended claims, particularly when read in conjunction with the accompanying drawing.

Figure 1:
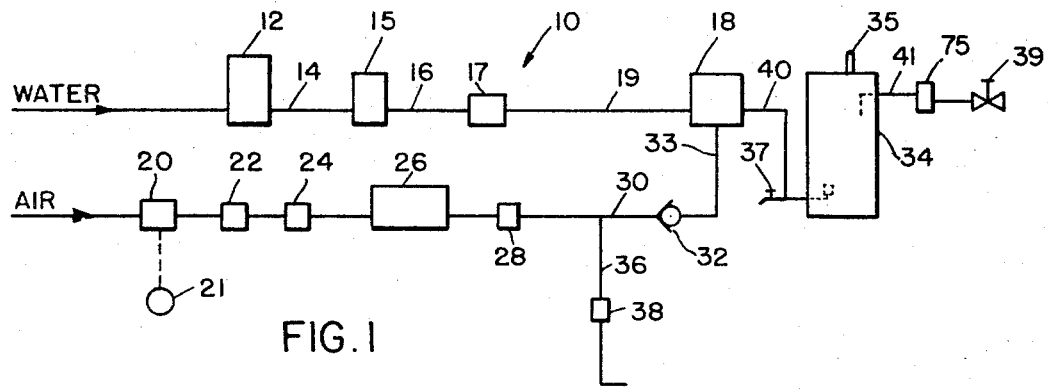
FIG. 1 is a flow diagram illustrating schematically the plumbing of a water purification system made in accordance with one embodiment of this invention.

Referring now to the drawings by numerals of reference, 10 designates a water purification system in which water is pumped from a well, or other source, into a tank 12, which is connected by a pipe 14 to a conventional filter 15. The filter 15 is connected in turn, by a pipe 16 to a fixture 17 containing a conventional flow switch 17'. This fixture, in turn, is connected by pipe 19 to a mixing valve 18. When a faucet is turned on in the below-noted household or domestic plumbing system, the flow of water at a predetermined, preset rate from line 16 through the fixture 17 to pipe 19 closes the flow-operated switch.

Air for the system is supplied by a conventional air compressor 20, which is connected at its input side to atmospheric air. The output of compressor 20 passes through a conventional water separator and filter 22, and through an air drier 24, which may contain, for instance, silica gel, to a standard ozone generator 26. Generator 26 is connected through a normally-closed, solenoid-operated valve 28, piping 30, a check valve 32, and piping 33 with the mixing valve 18. Check valve 32 is provided to prevent back flow.

Piping 30 is also connected through piping 36 with a normally-open, solenoid-operated valve 38. Valves 28 and 38 are conventional, and are held by springs in their normally-closed and normally-open positions, respectively.

Mixing valve 18 is connected by a pipe 40 to a conventional contact tank 34, which may be a Fiberglas tank, and in which the ozone is held in contact with the water to purify the same. A vent 35 at the top of this tank permits venting excess ozone to atmosphere. A drain valve 37 permits draining off impurities from the bottom of the tank.

The tank 34 is connected by a pipe 41 to a household plumbing system, which may comprise a plurality of manually-operable faucets, one of which is illustrated at 39 in FIG. 1.

Figure 2:
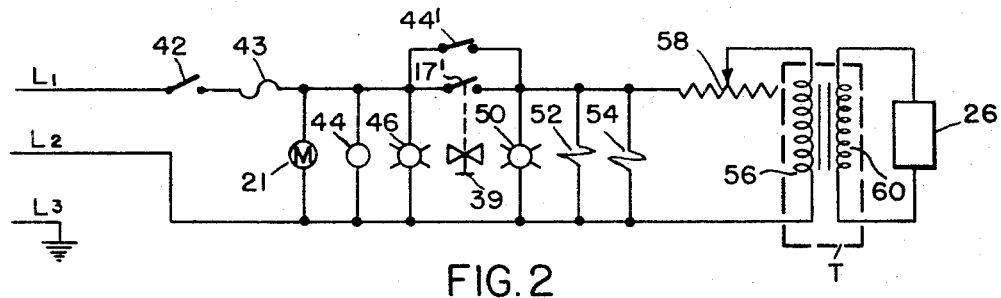
FIG. 2 is a wiring diagram illustrating one type of electrical control that may be employed with this system.

The electrical control for the system is illustrated in FIG. 2, and may be connected to a three phase, 60 cycle, 115 volt power source through lines L1, L2 and L3 when a manually-operable main line switch 42 is closed. 43 designates a conventional fuse. Connected in parallel across the line L1 and L2 to be energized when switch 42 is closed, are the compressor motor 21, an interval timer 44, and a warning lamp 46. Timer 44 operates periodically to close a normally-open switch 44', which is connected in line L1 in parallel with the normally-open flow switch 17'.

Connected in parallel across the lines L1 and L2 to be energized when main line switch 42 and either switch 44' or 17' are closed, is a further warning lamp 50, solenoids 52 and 54 for operating the valves 28 and 38, and the primary coil 56 of a transformer T. Coil 56 is connected in series with a conventional rheostat 58; and the secondary coil 60 of the transformer T is connected to the electrical apparatus in the ozone generator 26 to effect therein generation of ozone. The rheostat and the transformer control the ozone generator.

To operate the system 10, the switch 42 is closed, thereby closing a circuit to the compressor motor 21, the interval timer 44, and the warning lamp 46. This lamp indicates that the system is in operation. The compressor 20 then begins to draw in atmospheric air, which it compresses and feeds through the separator 22 and filter 24 to ozone generator 26. Assuming that the solenoid-operated valve 28 is at this time in its normally-closed position, the pressure in the compressor 20 builds up until the usual pressure switch (not illustrated), which is associated with the compressor 20, interrupts the operation of the compressor.

The householder may let a faucet drip, or may only draw a small amount of water at a time, say a glassful. That is why the interval timer 44 is provided. It will close the timer switch 44' periodically, say for five minutes in every hour, to insure that there will be sufficient ozone supplied to the tank 34 to purify the water for the house and thereby assure effective operation of the system. During this five minute period that switch 44' is closed, the warning lamp 50, the solenoids 52 and 54, and the coil 56 are energized, so that the valve 28 is opened, and the valve 38 is closed. The ozone developed by the generator 26 then passes through valves 28 and 32 to the mixing valve 18.

Regardless of whether or not, then, water is being drawn from the mixer 18 through an open faucet 39, ozone will be fed to the mixer and the tank 34 for at least five minutes every hour. Moreover, the flow switch 17' is automatically closed each time any of the faucets 39 in the system, is opened. As long as switch 17' is closed, the warning lamp 50, the solenoids 52 and 54, and the transformer coil 56 are energized, so that ozone is fed from the generator 26 and through the mixing valve 18 to tank 34 in the same manner as when the switch 44' is closed.

Whenever both switches 44' and 17' are open, the lamp 50 is deenergized to indicate that ozone is not being fed to the mixer 18.

When valve 38 is open, the pipe 30 vents to atmosphere to bleed off any undesirable moisture which might collect in pipe 30 rearwardly of valve 32. In its closed position, however, valve 38 blocks pipe 36.

Figures 3, 4, 5:
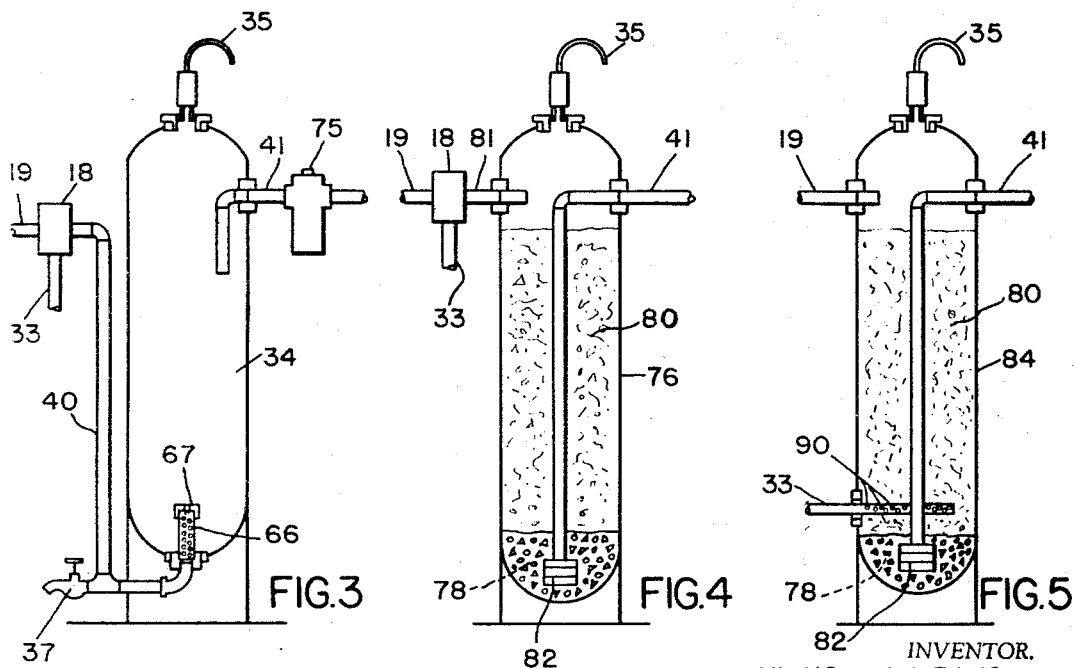
FIG. 3 is a vertical sectional view of one type of contact tank that may be employed with this system.
FIG. 4 is a vertical sectional view through another type of contact tank, which may be employed in this system.
FIG. 5 is a vertical sectional view through still another type of contact tank which may be employed in this system.

FIGS. 3, 4 and 5, wherein like numerals are employed to designate elements common to the system shown in FIGS. 1 and 2, illustrate three different tanks, any one of which may be used in a water purification system operating according to the present invention. The tank 34 illustrated in FIG. 3 is like that of FIG. 1. The tube or pipe 35 is secured in its upper end to vent the tank interior to the atmosphere. Secured in the lower end of the tank coaxially thereof is a perforated tubular diffuser 66, the upper end of which is sealed by a cap 67. The water and ozone are supplied to the lower end of the tank through the pipe 40 and diffuser 67. The draincock 37, of course, permits sediment to be drawn off from the bottom of the tank. Secured in the tank adjacent its upper end is the inner end of the outlet pipe 41, which may be connected through a conventional filter 75 to the household plumbing network containing the faucets 39.

When the system is in operation, if one of the faucets 39 is opened, water and ozone are admitted through the pipes 16 and 33, the mixing valve 18, and pipe 40 and diffuser 66 to the tank 34. The water and ozone entering the valve 18 are mixed for the first time, and are then subjected to further mixing as they pass through the diffuser 66 and into the tank 34 itself.

FIG. 4 illustrates a water-softener tank 76, which may be used as a contact tank. It has in its upper end a vent 35, similar to vent used with tank 34; and it has in its lower end a layer of gravel 78. The balance of the tank is nearly filled with a porous mineral bed 80, the lower end of which rests upon the gravel bed 78. A mixture of ozone and water is fed from the mixing valve 18, through a pipe 81 into the tank 76 above the top of the mineral bed 80. Secured in the top of the tank opposite the inlet pipe 81 is an outlet pipe 41, which leads to the plumbing network, containing the faucets 39. At its inner end pipe 41 extends downwardly through the mineral bed 80 coaxially of the tank 76 and into the gravel bed 78. Secured to the inner, lower end of the pipe 41 is a filter cap 82, which prevents gravel and other particulate impurities from being drawn upwardly in the outlet pipe 41. In this embodiment, the mixture of ozone and water that enters the top of the tank 76, filters downwardly through the mineral bed 80, and the gravel bed 78, and then passes upwardly through the outlet pipe 41, whenever switch 17' is closed.

In FIG. 5 again a water softener tank is used as the contact tank. This tank 84 has in its upper end a vent 35, and as in the case of the tank 76, contains a gravel bed 78 and a porous mineral bed 80 above the gravel bed. Also as in the preceding embodiment, the tank 84 has an outlet pipe 41, the inner end of which extends downwardly through the beds 80 and 78, and has secured to its lower end a conventional filter cap 82. Unlike the preceding embodiment, however, the ozone and water are not premixed before being fed into the tank 84. Instead, the water pipe 19 feeds directly into the top of the tank 84 above the mineral bed 80; and the ozone feed pipe 33 extends directly into the bottom of the tank just above the gravel bed 78. In its inner end pipe 33 has a plurality of perforations 90 by means of which the incoming ozone is diffused as it is blown into the tank. The advantage of this construction is that, during the counterflow of the raw inlet water and the ozone through the tank 84, the mixing time of the two is prolonged, since the water entering the tank through pipe 16 must pass downwardly for almost the complete length of the tank, while the incoming ozone must seep upwardly for substantially the same distance, before any excess thereof is exhausted to the atmosphere.

From the foregoing it will be apparent that the novel purification system disclosed herein affords very reliable and efficient means for purifying drinking water from any source thereof, and particularly well water. The timer 44 assures that purifying ozone will be periodically supplied to the previously purified water in contact tanks 34, 76 or 84, thereby to avoid any recontamination of the water in the tank as a result of prolonged failure to withdraw water from the tank through its outlet pipe 41. In the absence of this automatic, intermittent operation of the ozone generator 26, the system would be operated only upon the opening of one of the faucets and the consequent closing of switch 17'. This could result in infrequent operation of the system, and could lead to recontamination of the water in one of the tanks 34, 76 or 84. Moreover, by making switch 17' responsive to the faucets, it is assured that the purification system will always be working during the withdrawal of water from a tank 34, 76 or 84, thereby to insure that the replenishing water will also be purified.

In the late summer and fall, when the water level in a given locality is low, the sulphur and iron content of the water are most noticeable. At such times, therefore, the rheostat 58 may be adjusted to step up the generation of ozone in the generator 26, thereby to maintain the desired purification in the system.

Instead of using the gravel beds 78 to support the mineral beds 80, the mineral beds may be supported on rigid screens disposed transversely across the tanks 76 and 84 adjacent their lower ends. In such case the lower ends of the outlet pipes 41 in these tanks would extend downwardly beneath the screens. Moreover, it will be understood that the water in the tank 34, 76 or 84 may be maintained in a conventional manner at a predetermined level by, for example, a float-controlled valve (not illustrated) in the water supply line for the tank.

While the invention has been described in connection with specific embodiments thereof, it will be understood, then, that is it capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. Apparatus for purifying water, comprising
a contact tank,
means for connecting said tank to a supply of water,
an ozone generator,
means for suppling air to the input of said generator,
means including a normally-closed valve for connecting, when open, the output of said generator to said tank,
means for connecting the output of said tank to a water-delivery system having at leats one manually operable valve for controlling the flow of water from said tank to said system,
means for automatically opening said normally-closed valve, when said manually operable valve is open,
means operable for supplying power to said generator to effect the generation of ozone, when said normally-closed valve is open, and
automatic means operative periodically, and independently of the operation of said manually operable valve, simultaneously to supply said power to said generator and to open said normally-closed valve for a predetermined interval of time.

2. Apparatus as defined in claim 1, including
an outlet pipe opening at its inner end on the interior of said tank, and adapted to be connected at its opposite end to said system,
an inlet pipe opening at its inner end on the interior of said tank, and adapted to be connected at its opposite end to said water supply and to the output of said generator, whereby a mixture of water and ozone is fed through said inlet pipe to said tank, when said manually-operable valve is open, and
means in said tank for diffusing said mixture in said tank.

3. Apparatus as defined in claim 2, wherein
said inner ends of said inlet and outlet pipes open on said tank adjacent the upper and lower ends thereof, respectively, and
said diffusing means comprises a mineral bed in said tank between the upper and lower ends thereof, whereby the incoming mixture of water and ozone must flow downwardly through said bed before reaching said outlet pipe.

4. Apparatus for purifying water, comprising
a contact tank,
means for connecting said tank to a supply of water,
an ozone generator,
means for supplying air to the input of said generator,
means including a normally-closed valve for connecting, when open, the output of said generator to said tank,
means for connecting the output of said tank to a water-delivery system having at least one manually operable valve for controlling the flow of water from said tank to said system,
means for automatically opening said normally-closed valve, when said manually operable valve is open,
a solenoid, operative when energized, to open said normally-closed valve,
a normally-open switch in series circuit with said solenoid, and movable to its closed position to energize said solenoid each time said manually operable valve is opened,
a timer, and
a second normally-open switch in series with said solenoid, and intermittently movable to its closed position by said timer to energize said solenoid independently of the first-named switch.

5. Apparatus for purifying water, comprising
a contact tank,
means for connecting said tank to a supply of water,
an ozone generator,
means for supplying air to the input of said generator,
means including a normally-closed valve for connecting, when open, the output of said generator to said tank,
means for connecting the output of said tank to a water-delivery system having at least one manually operable valve for controlling the flow of water from said tank to said system,
means for automatically opening said normally-closed valve, when said manually operable valve is open,
an inlet pipe opening at its inner end in said tank adjacent the upper end thereof, and connected at its opposite end to said water supply,
a second inlet pipe opening at its inner end in said tank adjacent the lower end thereof and connected at its opposite end to the output of said generator,
an outlet pipe opening at its inner end in said tank beneath said second inlet pipe and adapted to be connected at its opposite end to said system, whereby fluid entering the tank flows downwardly to the outlet pipe, while ozone entering the tank through said second inlet pipe tends to flow upwardly, and
water softener means comprising a porous mineral bed in said tank between said inlet pipes.

6. Apparatus for purifying water, comprising
a contact tank,
means for connecting said tank to a supply of water,
an ozone generator,
means for supplying air to the input of said generator,
means including a normally-closed valve for connecting, when open, the output of said generator to said tank,
means for connecting the output of said tank to a water-delivery system having at least one manually operable valve for controlling the flow of water from said tank to said system,
means for automatically opening said normally-closed valve, when said manually operable valve is open,
means also for automatically and intermittently opening said normally-closed valve independently of the operation of said manually operable valve,
the first and second-named means for opening said normally-closed valve comprising a pair of switches,
a solenoid connected in circuit with said switches to be energized upon the closing of either of said switches, and operative, when energized, to open said normally-closed valve,
a timer connected in said circuit and operative intermittently to close one of said switches, and
the other of said switches being movable by said manually operable valve to its closed position, when the last-named valve is opened.

7. Apparatus for purifying water comprising
mixing means, means for supplying water to said mixing means,
an ozone generator,
means connecting said generator to said mixing means to supply ozone from said generator to said mixing means,
means for connecting said mixing means to a water delivery system, which includes a manually-operable valve for controlling delivery of water from said system,
electrically-operated means for actuating said generator on opening of said valve, and
separate electrically operated means for periodically actuating said generator independently of said valve.

8. Apparatus as claimed in claim 7, wherein the first-named electrically-operated means includes a flow-switch operable by the flow of water in said system upon the opening of said valve.

References Cited

UNITED STATES PATENTS

| | | | |
|---|---|---|---|
| 1,264,360 | 4/1918 | Begot | 210—98 |
| 2,043,701 | 6/1936 | Hartman | 210—63 X |
| 2,145,901 | 2/1939 | Shoemaker | 210—63 X |
| 2,660,559 | 11/1953 | Prime | 210—63 |
| 2,778,800 | 1/1957 | Sheahan | 210—135 X |

REUBEN FRIEDMAN, *Primary Examiner.*

JOHN ADEE, *Assistant Examiner.*

U.S. Cl. X.R.

210—135, 139, 192